Dec. 26, 1967  R. A. HARRIS ET AL  3,360,738
APPARATUS FOR CONVERTING AN EXPONENTIALLY DECAYING DC VOLTAGE
INTO AN EXPONENTIALLY DECAYING SINUSOIDAL VOLTAGE
Filed July 31, 1964  2 Sheets-Sheet 1

Ralph A. Harris
Freddy R. Tischler
INVENTORS

BY

E. Mickey Hubbard

United States Patent Office 3,360,738
Patented Dec. 26, 1967

3,360,738
APPARATUS FOR CONVERTING AN EXPONENTIALLY DECAYING DC VOLTAGE INTO AN EXPONENTIALLY DECAYING SINUSOIDAL VOLTAGE
Ralph A. Harris and Freddy R. Tischler, Houston, Tex., assignors to Texas Instruments Incorporated, Dallas, Tex., a corporation of Delaware
Filed July 31, 1964, Ser. No. 386,631
18 Claims. (Cl. 330—52)

ABSTRACT OF THE DISCLOSURE

An apparatus is disclosed for producing an AC signal having an exponentially varying amplitude. An exponentially varying DC voltage is produced by charging a capacitor to a DC reference voltage and then discharging the capacitor through a resistor. The exponentially decaying DC voltage is then acted on by a chopper, inverting the DC voltage into a series of alternating square pulses. These alternating square pulses are then amplified and filtered to form a sinusoidal wave whose amplitude varies at an exponential rate.

---

The present invention relates to methods of controlling gain, and more particularly to a method and apparatus for varying the gain of an amplifier at a predetermined rate.

U.S. Patent No. 3,083,341 discloses a system wherein the gain of an amplifier is inversely proportional to the amplitude of a high frequency control voltage having a frequency substantially above, or outside, the frequency band of interest. The amplifier is particularly suited for recording the electrical signals produced by a seismometer in response to the seismic signals returning to the surface of the earth. As pointed out in the above patent, it is desirable to have a variable gain amplifier so that the wide range of amplitudes of the seismic signals can be recorded on a record strip of reasonable width. However, it is important to be able to accurately control the gain so that the actual relative amplitudes of the seismic signals can be determined. It is desirable for the amplifier to initially operate at a low gain value, preferably in automatic gain control mode, until the first high intensity seismic waves are detected. Then the gain should be increased at some predetermined rate to a final maximum value so that the weaker seismic signals returning from greater depths may be recorded with sufficient amplitude to be easily interpreted. An improved amplifier of this type is also described and claimed in copending U.S. application S.N. 386,630, entitled, "High Accuracy and High Speed Gain Control System," filed on even date herewith by Harris et al. and assigned to the assignee of the present invention.

A simple exponential increase in gain, that is a linear db increase with respect to time, is an acceptable gain function. The problem is in obtaining an accurate exponential decrease of the high frequency voltage used to control the gain over a wide dynamic range, which must usually be on the order of 100 db. Previous methods have employed a fixed amplitude oscillator followed by some form of amplitude modulator. The simplest of these methods varies the grid bias of a vacuum tube. However, the tube characteristics are nonlinear which results in a loss of accuracy, and further, the dynamic range of control is quite small. The dynamic range can be increased by cascading two or more vacuum tube stages and varying the grid bias of each, but this multiplies the errors produced by the individual stages.

The accuracy with which the amplitude of the high frequency control voltage is varied can be improved by using a feedback loop type modulator. This type of modulator consists of a comparator which compares the peak of an AC voltage to a DC voltage with the output of the comparator operating a variable attenuator in the AC voltage path so as to make the peak of the AC voltage equal to the DC voltage which can be a resistor-capacitor exponentially decreasing voltage. The disadvantage of this system is that the modulator has a rather small dynamic range, 40 db being about the largest obtainable. Again, two or more modulators can be cascaded to increase the dynamic range, but this multiplies the errors of the individual modulators and leads to a very complicated device. Another method which has heretofore been used is a motor driven potentiometer to provide the amplitude variation of the high frequency voltage. Such a system has good accuracy but is rather cumbersome and it is difficult to selectively vary the rate of change of the amplitude.

The present invention is concerned with providing a method for varying the gain of a seismic or other amplifier system at a predetermined rate, and more specifically for varying, with considerable accuracy over a wide dynamic range, the amplitude of a high frequency voltage in a predetermined manner with respect to time. In general, the method comprises varying a DC reference voltage at a predetermined rate, and inverting the DC reference voltage as it varies to produce a high frequency AC voltage having an amplitude corresponding to the magnitude of the DC reference voltage. More specifically, a capacitor is charged to a predetermined DC voltage level, then at some point in time is discharged through a resistor at an exponential rate dependent upon the values of the capacitor and the resistor. During this decay period, the DC voltage across the capacitor is inverted to produce a high frequency AC voltage of corresponding amplitude.

The invention also contemplates a method for controlling the upper and lower stable limits of the AC voltage output so as to accurately control the lower and upper gain values of the controlled amplifier. The upper limit of the AC voltage is determined primarily by the input DC voltage. The lower limit of the AC voltage may be controlled by adding a second reference voltage either to the AC output voltage or the DC reference voltage applied to the inverter. In one embodiment, an AC reference voltage having a predetermined amplitude and a corresponding phase and frequency is added to the AC voltage from the inverter. Then the initial amplitude of the AC signal is the sum of the two reference voltages and the final amplitude is merely the second AC reference voltage. In another embodiment, an automatic gain control loop is provided to add a second DC voltage to the inverter and thereby maintain a minimum stable DC voltage at the inverter.

In accordance with another aspect of the invention, the DC reference voltage used to charge the capacitor may be provided by the average output voltage of one or more amplifiers, the gains of which are being controlled by the high frequency AC control voltage being produced. This provides an initial automatic gain control mode for either an individual amplifier, or a common automatic gain control level for a number of amplifiers so that slight differences in the intensity of seismic signals detected by a plurality of seismometers may be accurately recorded.

The present invention also contemplates novel systems for implementing these methods, which systems will hereafter be described in greater detail and distinctly pointed out in the appended claims.

Therefore, an important object of the present invention is to provide a method and system for producing a high frequency AC voltage having accurate upper and lower limits and an accurate rate of change between the limits at a selected point in time.

Another object of the present invention is to provide a system of the type described which is capable of attaining dynamic ranges as large as 100 db.

Another object of this invention is to provide a novel circuit for inverting a decaying DC reference voltage to an AC voltage of corresponding amplitude.

A further object of the invention is to provide a novel automatic gain control loop for accurately maintaining the A.C. control voltage at a preselected minimum amplitude.

Still another object is to provide such a system wherein the amplitude of the AC control voltage may be varied as the output of one or more controlled amplifiers so as to provide an automatic gain control mode of operation.

Yet another object of the present invention is to provide a system for controlling the final amplitude of the AC voltage without materially interfering with the exponential rate of change.

Additional objections and advantages of the invention will be evident to those skilled in the art from the following detailed description and drawings, wherein.

Figure 1:
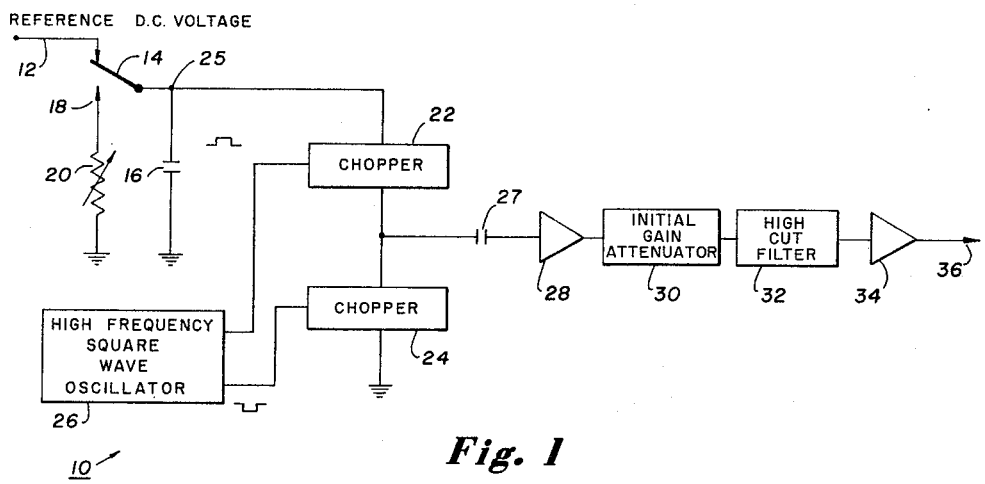
FIGURE 1 is a schematic diagram of a system constructed in accordance with the present invention.

Although the present invention is not limited, in its broader aspects, to use in controlling the gain of a seismic or other amplifier, the following specific embodiments are particularly suited for that purpose and will therefore now be described in that context. Referring now to FIGURE 1, a system constructed in accordance with the present invention is indicated generally by the reference numeral 10. A DC reference voltage is applied through a conductor 12 and a switch 14 to charge a capacitor 16 with respect to ground. When the switch 14 is moved from the charging position indicated to the contact 18, the capacitor 16 is disconnected from the DC reference voltage terminal 12 and is discharged through a variable resistor 20 to ground. The voltage impressed across the capacitor 16 by the DC reference voltage is applied across a pair of series connected choppers 22 and 24 to ground. The alternate half-cycles from a high frequency square wave oscillator 26 drive the choppers 22 and 24 in synchronism so that when the chopper 22 is closed, the chopper 24 is open and, conversely, when chopper 24 is closed, the chopper 22 is open. A coupling capacitor 27 AC couples the output of the choppers 22 and 24 to a buffer amplifier 28. The amplifier 28 has a high input impedance and drives an initial gain attenuator 30 for determining the initial amplitude of the AC control voltage and therefore the gain of amplifier. The amplifier 28 also drives a high cut filter 32 which converts the square wave produced by the choppers to a sine wave by eliminating the high frequencies. The output of the filter 32 is connected to a second high input impedance buffer amplifier 34. The output 36 of the amplifier 34 is the output of the system and is connected to the input of the amplifier being controlled in the manner described in the above-reference patent and patent application. For example, the output 36 would be connected to the lead 34 in the circuit illustrated in FIGURE 1 of U.S. Patent No. 3,083,341, and to the summing circuit 14 in the above-referenced patent application.

In the operation of the system 10, a DC reference voltage is applied to the terminal 12 to charge the capacitor 16 through the switch 14. When the chopper 24 is open and chopper 22 closed, the voltage appearing at junction 25 is applied to the coupling capacitor 27, and when the chopper 24 is closed and chopper 22 is open, the capacitor 27 is connected to ground. Thus the DC voltage at junction 25 is inverted to produce a square wave signal having an amplitude directly related to the voltage at junction 25 and having a frequency corresponding to the frequency of the oscillator 26. As herein used, a high frequency is considered to be a frequency well above or otherwise outside the frequency band of interest in the seismic or other amplifier the gain of which is being controlled. When the switch 14 is moved against contact 18, the DC reference voltage is disconnected from the capacitor 16 and the capacitor is discharged through the resistor 20 at an exponential rate (a linear db rate). Therefore the voltage at junction 25 and the amplitude of the AC control voltage decay at the same exponential rate until the capacitor is discharged.

The AC control voltage produced by inverting the DC voltage at junction 25 is passed through the amplifier 28 which has a high input impedance and which drives the attenuator 30 and filter 32. The initial gain attenuator 30 is used to adjust the amplitude of the square wave AC control voltage and the high cut filter 32 converts the square wave to the sine wave needed to control the gain of the amplifier. The high input impedance of the buffer amplifier 34 maintains the voltage level of the signal with considerable accuracy. The gain of the amplifier being controlled is inversely proportional to the amplitude of the AC control signal. Thus the initial gain of the amplifier is low to record high energy seismic signals for example, then increases exponentially to a final high gain value. The exponential rate of change results from the discharge of the capacitor 16 through the resistor 20 and the rate of change can therefore be controlled by the setting of the variable resistor 20. The initial amplitude of the AC control voltage is determined by the initial gain attenuator 30, and the value of the DC reference voltage impressed across the capacitor.

Figure 2:
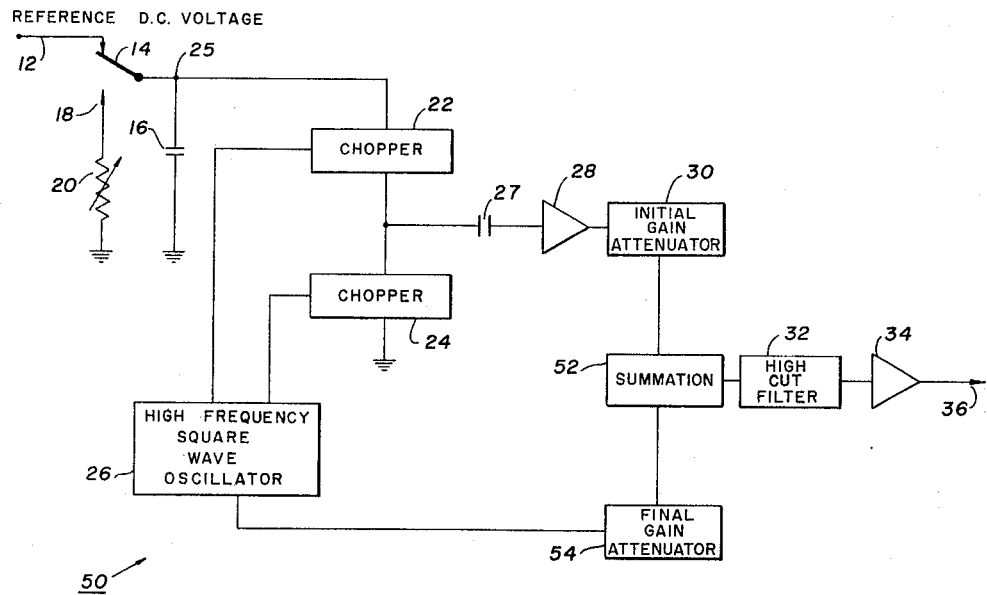
FIGURE 2 is a schematic diagram of another system constructed in accordance with the present invention.

Referring now to FIGURE 2, another system constructed in accordance with the present invention is indicated generally by the reference numeral 50. The system 50 is substantially identical to the system 10 and corresponding components are therefore indicated by corresponding reference numerals. The system 50 is identical in operation to the system 10 except that provision is made for controlling the final amplitude of the AC control voltage. A summation network 52 is connected in the circuit between the initial gain attenuator 30 and the high cut filter 32. A full wave from the high frequency square wave oscillator 26 that is in phase with the AC voltage from the choppers is passed through a final gain attenuator 54 and applied to the summation network 52 where it is added linearly with the AC voltage from the choppers. The final gain attenuator 54 is provided to adjust the amplitude of the full wave from the oscillator so as to control the final amplitude of the AC control voltage.

In the operation of the system 50, the capacitor 16 is initially charged by the DC reference voltage. The voltage across the capacitor 16 is inverted by the choppers 22 and 24 as previously described to produce a high frequency square wave having a peak-to-peak amplitude corresponding to the DC voltage at junction 25. This square wave voltage signal is passed through the amplifier 28 and the initial gain attenuator 30 to the summation circuit 52 where it is added to the full wave voltage signal from the oscillator 26 as reduced by the final gain attenuator 54. Thus the output from the summation circuit 52 is a square wave voltage signal having a peak-to-peak amplitude directly related to the sum of the two AC voltage signals. The amplitude of the sum voltage is determined by the settings of the initial and final gain attenuators.

The AC voltage sum is then passed through the high cut filter where it is reduced to a sine wave, applied to the buffer amplifier 34, and passed through the output 36 to the input of the controlled amplifier. At some point in time the switch 14 is moved to the contact 18 and the capacitor 16 discharged through the resistor 20 at an exponential rate dependent upon the setting of resistor 20. This results in a similar decline in the amplitude of the AC voltage from the inverter comprised of the choppers 22 and 24 and at the output 36 until such time as the capacitor 16 has completely discharged. Then the final voltage of the AC output signal will be proportional to the voltage of the full square wave voltage from the oscillator 26. The final amplitude of the AC control signal is set by the final gain attenuator 54. The gain of the amplifier being controlled therefore changes at some exponential rate determined by the value of the resistance 20 from some constant low value determined by the initial gain attenuator 30 to some final high gain value determine by the final gain attenuator 54.

Figure 3:
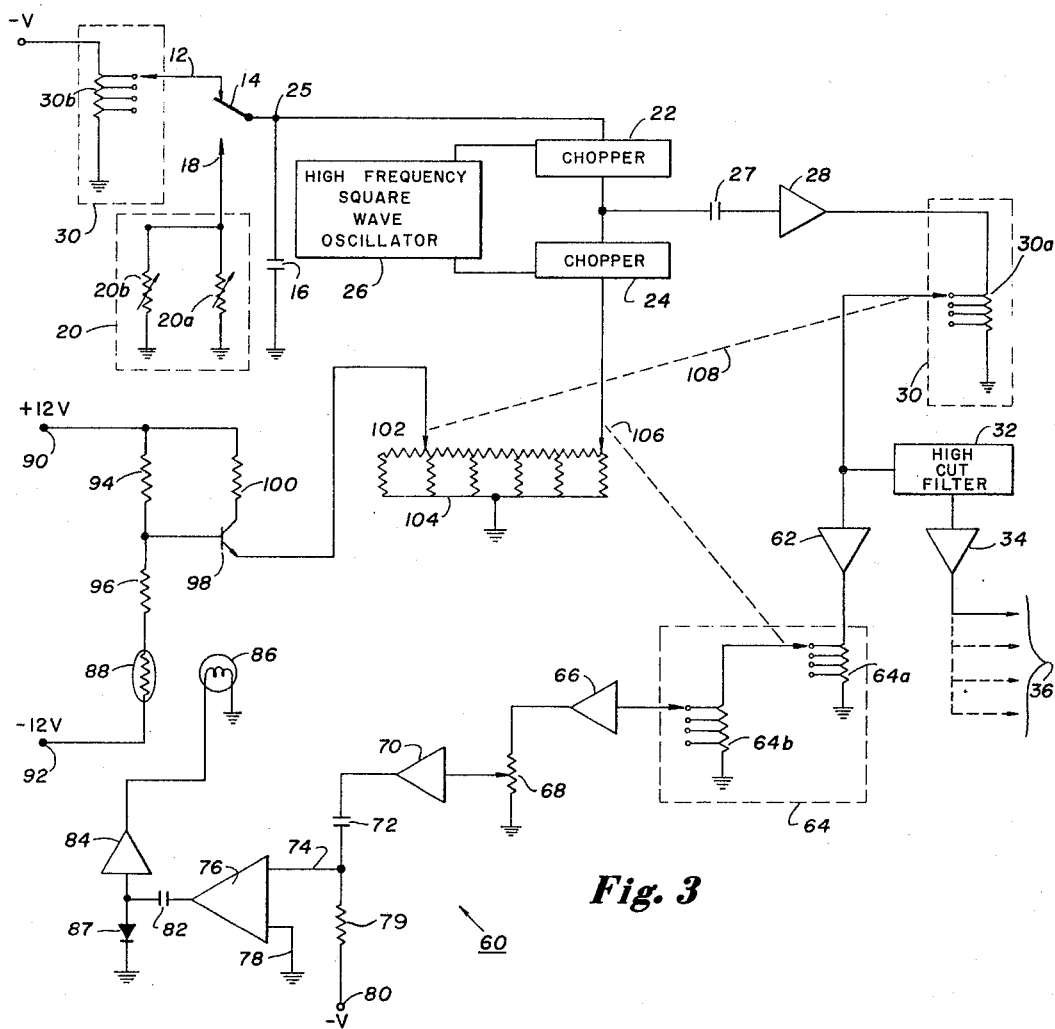
FIGURE 3 is a schematic diagram of still another system constructed in accordance with the present invention; and, FIGURE 4 is a schematic diagram of a system which may be used in combination with either of the embodiments shown in FIGURES 1, 2 or 3.

Referring now to FIGURE 3, a more sophisticated and perferred embodiment of the present invention is indicated generally by the reference numeral 60. The system 60 includes the basic components of the system 10 which are designated by corresponding reference numerals. In this embodiment, the initial gain attenuator 30 is preferably a "units-tens" type attenuator having the "tens" portion 30a connected to attenuate the voltage between the buffer amplifier 28 and the high cut filter 32 and the "units" portion 30b connected to attenuate the DC reference voltage applied to terminal 12. Also, the variable rate resistor 20 is preferably comprised of a "units-tens" type resistor having a "tens" portion 20a and a "units" portion 20b for increased control.

In the system 60, the final amplitude of the AC control voltage at output 36 is maintained at a constant value by an automatic gain control loop wherein the amplitude of the AC control voltage is compared with a DC reference voltage to accurately maintain a fixed amplitude level without interfering with the exponential rate of change. The automatic gain control loop is comprised of an amplifier 62 which is connected to the output of the initial gain attenuator 30 and drives a final gain attenuator 64. The final gain attenuator 64 is preferably a "units-tens" type attenuator having a "tens" section 64a and a "units" section 64b which may produce 10 db and 1 db steps, for example, in the gain of the amplifier being controlled. The output from the attenuator 64 is connected to a second amplifier 66 which drives a calibration resistor 68. The sliding contact of the resistor 68 is connected to the input of a third amplifier 70 which is AC-coupled by a capacitor 72 to one input 74 of a comparator amplifier 76. A negative DC reference voltage represented by the terminal 80 is applied to the input 74 through a resistor 79 and the other input 78 is connected to ground so that the negative DC reference voltage is applied across the inputs. The comparator amplifier 76 produces no output until the positive portion of the AC voltage signal from amplifier 70 exceeds the negative reference voltage, at which time the output of the comparator amplifier 76 moves in the negative direction. The output of the comparator amplifier 76 is therefore an amplification of these portions of the positive half-cycles of the AC feedback signal which exceed the negative reference voltage.

The output of the comparator 76 is AC-coupled through capacitor 82 to the input of a unity gain amplifier 84 with sufficient current output to drive an incandescent lamp 86. A diode 87 provides DC restoration for capacitor 82. The output from the amplifier 84 is a series of pulses having a repetition rate sufficiently high to produce a fairly steady light level due to the thermal time-constant of the lamp 86 which is chosen small enough to permit the light intensity to change at a fast rate and thereby provide a fast-acting control loop. The light 86 illuminates a photoconductive cell 88 the resistance of which decreases with an increase in illumination. The photoconductive cell 88 is part of a voltage divider between a positive voltage terminal 90 and a negative voltage terminal 92 formed by resistors 94 and 96. The base of a transistor 98 is connected to the junction between the resistors 94 and 96. The collector of transistor 98 is connected through resistor 100 to the positive voltage supply terminal 90, and the emitter is connected to one sliding contact 102 of a low impedance, ladder-type attenuator 104. The chopper 24 is connected through sliding contact 106 of the attenuator 104 to ground. The sliding contact 102 is mechanically connected to the sliding contact of the attenuator 30 as represented by the dotted line 108 so that the total loop gain will tend to be maintained constant during adjustment of the initial gain. Similarly, the sliding contact 106 of the ladder attenuator 104 is mechanically connected to a sliding contact of the attenuator 64 so as to tend to maintain a constant loop gain.

Initially the negative reference voltage is applied through the attenuator 30b and the switch 14 to charge the capacitor 16 and a high amplitude AC voltage is produced at output 36 as heretofore described so that the gain of the amplifier being controlled will be at a constant minimum value. The initial gain of the amplifier may be selected by adjustment of the initial gain attenuator 30 which adjusts the magnitude of both the reference voltage applied to the capacitor 16 by means of the section 30b and the amplitude of the AC output from the amplifier 26 by means of the section 30a. Since the amplitude of the AC voltage is high, the positive portion of the AC signal applied to the input 74 of comparator amplifier 76 will be considerably greater than the negative reference voltage at 80 so that the output from the comparator amplifier 76 will be at a maximum value. Therefore the intensity of the lamp 86 will be at a maximum and the resistance of the photoconductive cell 88 will be at a minimum. This back-biases the transistor 98 so that no voltage is applied to the ladder attenuator 104 and the only voltage applied to the choppers 22 and 24 is the voltage at junction 25.

When the switch 14 is thrown at some point in time, the capacitor 16 discharges through the variable resistor 20 and the voltage at point 25 decays at an exponential rate determined by the resistance valve of resistor 20. The voltage at junction 25 is inverted by the choppers 22 and 24 to produce an AC control voltage the amplitude of which declines at a corresponding rate as heretofore described. As the amplitude of the AC signal declines, the output from the comparator amplifier 76 declines and the intensity of the lamp 86 declines until the resistance of the photoconductive cell 88 is such that the base of transistor 98 is forward-biased and a positive voltage is applied across the ladder attenuator 104. The positive voltage across the attenuator is then added to the negative voltage remaining at junction 25. The peak-to-peak voltage of the high frequency AC output signal from the choppers will then be maintained substantially at the same value by the automatic gain control loop as the intensity of the lamp 86 continues to decrease because a very small additional decrease in the amplitude of the AC voltage from attenuator 30a will produce a sufficient error signal to increase the voltage across the ladder 104 to offset the continued decay of the voltage at junction 25.

Thus the initial high amplitude of the AC voltage and therefore the initial gain of the controlled amplifier is determined by the voltage applied to the section 30b of the attenuator 30 and the setting of the attenuator 30, the exponential decline of the output voltage, and therefore the exponential increase of the gain of the controlled amplifier, is determined by the setting of the variable resistor 20, and the final low AC voltage level and final high gain of the amplifier is determined by the setting of the final gain attenuator 64.

Figure 4:
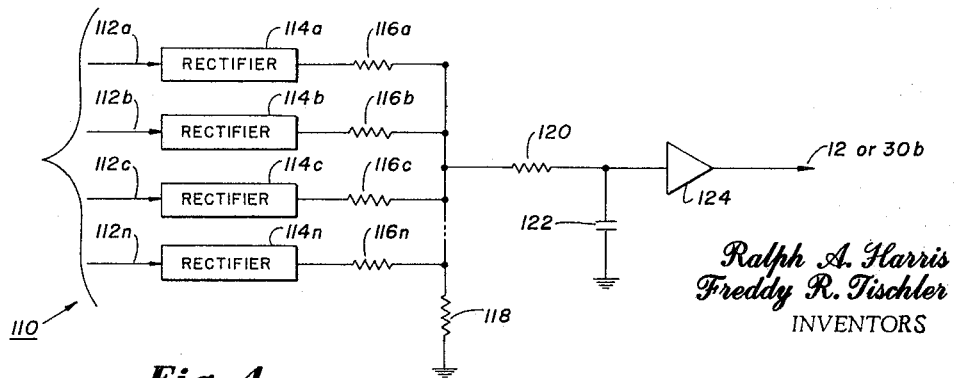

In accordance with another aspect of the present invention, either of the systems 10, 50 or 60 may be operated in the automatic gain control mode merely by applying a DC reference voltage to the input terminal 12 that is proportional to the output of the amplifier being controlled. Further, the systems may be operated so as to maintain a uniform automatic gain based on the average output of a plurality of amplifiers. This is useful when recording the individual seismic signals detected by an array of seismometers by a gang of amplifiers so that the relative amplitudes of the seismic signals can be retained and recorded. A system for obtaining the average output of several amplifiers so as to provide an average automatic gain is indicated generally by the reference numeral 110 in FIGURE 4. The system 110 contemplates that the output 36 will be connected to each input of the amplifiers being controlled. The AC outputs of the controlled amplifiers are connected through leads 112a, 112b, 112c and 112n, for an n number of amplifiers, to rectifiers 114a–114n, respectively, and the DC output passed through summing resistors 116a–116n, respectively. The currents through the resistors 116a–116n are then applied to a resistor 118 so that the voltage across the resistor 118 will represent the average voltage across the resistors 116a–116n. A resistor 120 and capacitor 122 provide a smoothing filter for the voltage across the resistor 118 and set the automatic gain control time-constant. In an automatic gain control system of this type it is desired that the output be held fairly constant over a large range of input signals, such as a range of about 100 db. Since it is desired to hold the outputs from the controlled amplifiers to a 6 db range, it is necessary to employ a non-linear DC amplifier 124 to expand the 6 db range to a 100 db range. The amplifier 124 is a conventional exponential amplifier and its output is applied to the reference voltage terminals 12 of either of the systems 10 or 50 or the attenuator 30b in the system 60. Although the automatic gain control mode system is described with regard to a gang of amplifiers, it will be appreciated that the system could be used for a single amplifier if desired.

When the system 110 is connected to the system 60, for example, the outputs 36 are connected to a plurality of amplifiers and the outputs from the amplifiers fed back to the rectifiers 114a–114n. When used for recording the individual seismic signals detected by an array of seismometers, the system is initially operated in the automatic average gain control mode. The DC output voltage from the amplifier 124 will be applied to the attenuator 30b. The high frequency AC control voltage at the outputs 36 will then vary directly with the DC voltage, and the gain of the controlled amplifiers will vary inversely so as to provide automatic gain control. Any individual variations in the output levels of the several controlled amplifiers will be averaged by the circuit 110 so that the gain of all of the amplifiers will be equal. At some point in time, such as immediately after receipt of the first intense seismic signals by the several amplifiers, the switch 14 is moved against contact 18 so that the DC voltage representative of the average output is disconnected from the capacitor 16 and the capacitor will discharge exponentially through the resistance 20. The amplitude of the high frequency AC control voltage at the outputs 36 will then decline exponentially, and the gain of the several amplifiers will increase exponentially, until such time as the positive portion of the AC signal applied to the input 74 of the comparator amplifier 76 is sufficiently small that the transistor 98 begins to add in a positive voltage through chopper 24 to stabilize and maintain the amplitude of the high frequency AC control voltage at a predetermined low value as the capacitor 16 continues to discharge. As heretofore described, the initial automatic gain control level is determined by the initial gain attenuator 30, the rate of increase of the gain is determined by the setting of the variable resistor 20, and the final gain is determined by the final gain attenuator 64.

From the above detailed description of several preferred embodiments of the invention, it will be evident that a method and system for accurately producing a time-varied high frequency control voltage and therefore time-varied gain has been described. Both the initial and final amplitudes of the high frequency control voltage and therefore the final gain of the controlled amplifier can be predetermined so that both the initial and the final gain of the amplifier can be preselected. The rate of change can also be selected. The system may be operated in automatic gain control mode at a predetermined average level to control one or a gang of amplifiers, and the gain of all the amplifiers can be synchronously varied at a uniform rate.

Although several preferred embodiments of the invention have been described in detail, it is to be understood that various changes, substitutions and alterations can be made therein without departing from the spirit and scope of the invention as defined by the appended claims.

What is claimed is:

1. A system for producing an AC voltage, the amplitude of which varies at a predetermined rate comprising:
    a source of DC voltage having a predetermined magnitude,
    a capacitance,
    means operative for applying said source of DC voltage across the capacitance for charging said capacitance,
    said means being also operative for discharging said capacitance at a predetermined rate,
    a pair of choppers connected in series across said capacitance,
    means for alternately operating said choppers, whereby an AC voltage is produced at the junction between said choppers,
    an attenuator,
    a high cut filter,
    an amplifier AC-coupled to the junction between the choppers and connected to drive said attenuator for selectively varying the amplitude of the AC signal and connected to said high cut filter for producing a sine wave, and
    a buffer amplifier having a high input impedance connected to the output of said high cut filter.

2. A system as defined in claim 1 further characterized by:
    a full wave output from the oscillator that is in phase with the AC signal,
    second attenuator means for selectively alternating the full wave output from the oscillator, and
    summation network means for summing the output from the attenuator for selectively varying the amplitude of the AC voltage produced by inversion of the DC voltage and the output from the second attenuator means whereby the initial amplitude of the total AC signal may be selectively varied and the final amplitude of the total AC signal may be selectively varied.

3. A system as defined in claim 2 wherein the means for discharging the capacitance comprises:
    a variable resistance, and
    means for connecting the resistance across the capacitance and disconnecting the DC voltage applied across the capacitance, whereby the DC voltage across the capacitance will decay at an exponential rate determined by the value of the resistance.

4. A system for producing an AC voltage, the amplitude of which varies at a predetermined rate, comprising:
    a source of DC voltage having a predetermined magnitude,
    means for varying a DC voltage from said source at said predetermined rate,
    means for inverting the DC voltage as it varies to produce an AC voltage having an amplitude corresponding to the varying magnitude of the DC voltage, and summation network means for summing a second AC voltage and the AC voltage produced by inversion of the DC voltage, the second AC voltage being of the same frequency and in phase with said AC voltage whereby the final amplitude of the total AC voltage is maintained at a predetermined value.

5. A system as defined in claim 4 wherein: said DC voltage source includes means for averaging the AC output voltage of a plurality of amplifiers thereby producing a DC voltage representative of the average of the outputs.

6. A system as defined in claim 5 wherein the means for averaging the AC output voltages comprises:
 a rectifier for rectifying each AC output voltage,
 a separate resistor connected to the output of each rectifier,
 an averaging resistor connecting each separate resistor to ground such that the total current from the rectifiers will pass through the resistor to ground and the voltage across the averaging resistor will represent the average output voltage, and
 means for applying the voltage across the averaging resistor to said means for varying a DC voltage.

7. A system as defined in claim 6 wherein the means for applying the voltage across the averaging resistor to said means for varying a DC voltage comprises:
 an exponential amplifier.

8. A system for producing an AC voltage, the amplitude of which varies at a predetermined rate, comprising:
 a source of DC voltage having a predetermined magnitude,
 means for varying a DC voltage from said source at said predetermined rate,
 a pair of choppers connected in series across said means for varying a DC voltage for inverting the DC voltage,
 a square wave oscillator for alternately operating said choppers, whereby an AC voltage is produced at the junction between the choppers, and
 summation network means for summing the full wave from the oscillator and the AC voltage produced by inversion of the DC voltage, whereby the final amplitude of the total AC voltage after discharge of the capacitor is maintained at a predetermined value.

9. A system for producing an AC voltage that varies at a predetermined rate comprising:
 means for producing a first DC voltage which varies from a first value to a second value in a predetermined manner with respect to time,
 means for inverting the first DC voltage comprising first and second choppers serially connected across the DC voltage and means for operating the choppers alternately, the junction between the choppers producing the AC voltage, and
 feedback means responsive to the amplitude of the AC voltage relative to a reference voltage for maintaining the AC voltage at a predetermined minimum amplitude by applying a second DC voltage to the choppers having a polarity which will be summed with the first DC voltage.

10. A system as defined in claim 9 wherein:
 the first voltage is connected to the first chopper and the second DC voltage is connected to the second chopper and is of opposite polarity whereby the sum of the two DC voltages will determine the amplitude of the AC voltage, yet the two DC voltages will be isolated.

11. A system as defined in claim 9 wherein the means for producing the first DC voltage comprises:
 a capacitance having one terminal connected to one of the choppers,
 means for applying a DC voltage to the capacitance to charge the capacitance,
 a resistance, and
 means for disconnecting the DC voltage from the capacitance and for connecting the resistance across the capacitance,
 whereby as the capacitance discharges through the resistance the DC voltage at the terminal connected to the chopper will decay exponentially.

12. A system for producing an AC voltage that varies at a predetermined rate comprising:
 first and second interconnected choppers,
 means for operating the choppers alternately,
 a capacitor connected between the first chopper and ground,
 a first resistor connecting the second chopper to ground,
 means for applying a first DC voltage across the capacitor,
 a second resistance connected to ground,
 means for disconnecting the first DC voltage from the capacitor and connecting the second resistor and capacitor such that the capacitor will discharge through the second resistance to ground,
 an output amplifier AC-coupled to the junction between the choppers, and
 an automatic gain control loop connected to the output amplifier for maintaining the AC voltage output at a preselected minimum level by applying a second DC voltage across the first resistance of opposite polarity to the first DC voltage.

13. A system as defined in claim 12 wherein:
 the automatic gain control loop includes means for comparing the AC output voltage to a DC reference voltage and producing an error signal related to the difference.

14. A system as defined in claim 12 wherein the automatic gain control loop is comprised of:
 amplifier means having a selectively variable gain,
 a comparator amplifier having a pair of differential inputs, one of the inputs being connected to the output of the amplifier means,
 means for applying a reference voltage across the differential inputs such that only the portion of each half-cycle of the AC voltage that exceeds the reference voltage will be amplified by the comparator amplifier, and
 means responsive to the output of the comparator amplifier for applying the DC voltage across the first resistor.

15. A system as defined in claim 14 wherein the means responsive to the output of the comparator amplifier comprises:
 an amplifier the input of which is connected to the output of the comparator amplifier,
 a lamp connected to the output of the amplifier and illuminated in proportion to the output thereof,
 a voltage divider comprised of two resistances connected across a supply voltage, one of the resistances comprising a photo-variable resistance optically coupled to the lamp, and
 means connecting the junction between the resistances of the voltage divider to the junction between the second chopper and the first resistor.

16. A system as defined in claim 12 further characterized by:
 an initial amplitude control attenuator connected in the circuit between said source of DC voltage and said automatic gain control loop for selectively establishing the initial amplitude of the AC voltage output.

17. A system as defined in claim 12 wherein:
 the second resistance is a variable resistor for selectively establishing the rate of discharge of the capacitor.

18. A system as defined in claim 12 further characterized by:
 attenuator means in said automatic gain control loop for selectively establishing the minimum amplitude of the AC voltage output of the system.

(References on following page)

References Cited

UNITED STATES PATENTS

| | | | |
|---|---|---|---|
| 2,459,177 | 1/1949 | Moseley et al. | 330—10 |
| 2,571,746 | 10/1951 | Mouzon | 330—10 |
| 2,953,752 | 9/1960 | Porter | 330—9 |
| 2,958,027 | 10/1960 | Moseley et al. | 320—1 X |
| 3,211,926 | 10/1965 | Frysinger. | |

OTHER REFERENCES

Massey, "A Review of the Transistor Chopper," Semiconductor Products, February 1961, pages 42–46.

NATHAN KAUFMAN, *Acting Primary Examiner.*

ROY LAKE, *Examiner.*

J. MULLINS, *Assistant Examiner.*